United States Patent
Song et al.

(10) Patent No.: US 12,041,629 B2
(45) Date of Patent: Jul. 16, 2024

(54) MULTI-TRANSMISSION RECEPTION POINT (TRP) CONFIGURATION METHOD AND DEVICE, AND STORAGE MEDIUM

(71) Applicant: VIVO MOBILE COMMUNICATION CO., LTD., Dongguan (CN)

(72) Inventors: Yang Song, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 353 days.

(21) Appl. No.: 17/486,876

(22) Filed: Sep. 27, 2021

(65) Prior Publication Data

US 2022/0015078 A1    Jan. 13, 2022

Related U.S. Application Data

(63) Continuation of application No. PCT/CN2020/081702, filed on Mar. 27, 2020.

(30) Foreign Application Priority Data

Mar. 29, 2019   (CN) .......................... 201910253502.8

(51) Int. Cl.
*H04W 72/23*   (2023.01)
*H04L 5/00*   (2006.01)

(52) U.S. Cl.
CPC ........... *H04W 72/23* (2023.01); *H04L 5/0053* (2013.01)

(58) Field of Classification Search
CPC ............................ H04W 72/23; H04L 5/0053
See application file for complete search history.

(56) References Cited

U.S. PATENT DOCUMENTS

| | | | |
|---|---|---|---|
| 2019/0098520 A1 | 3/2019 | Kim | |
| 2022/0095354 A1* | 3/2022 | Kim | H04W 24/10 |
| 2022/0116183 A1* | 4/2022 | Gao | H04L 1/1812 |

FOREIGN PATENT DOCUMENTS

| | | |
|---|---|---|
| CN | 108134659 A | 6/2018 |
| CN | 109076412 A | 12/2018 |
| CN | 109121205 A | 1/2019 |
| CN | 109392140 A | 2/2019 |
| CN | 109451585 A | 3/2019 |

OTHER PUBLICATIONS

International Search Report issued in corresponding International Application No. PCT/CN2020/081702, mailed Jun. 30, 2020, 4 pages.

(Continued)

*Primary Examiner* — Chandrahas B Patel
(74) *Attorney, Agent, or Firm* — IPX PLLC

(57) ABSTRACT

Embodiments of the present disclosure provide a multi-transmission reception point (TRP) configuration method and device, and a storage medium. The method includes: configuring one physical channel-configuration information element (IE) to correspond to a plurality of control resource sets (CORESET); or configuring a plurality of physical channel-configuration IEs to corresponds to a plurality of CORESETs, where the plurality of CORESETs correspond to a plurality of TRPs, and at least one CORESET of the plurality of CORESETs corresponds to one TRP.

15 Claims, 2 Drawing Sheets

(56) References Cited

OTHER PUBLICATIONS

Huawei et al., "Summary of AI: 7.2.8.2 Enhancements on Multi-TRP/Panel Transmission of Offline Discussion", 3GPP TSG RAN WG1 Meeting #96 R1-1903541, Mar. 1, 2019.
Vivo, "Further Discussion on Multi-TRP Transmission", 3GPP TSG RAN WG1 #96bis R1-1904096, Apr. 12, 2019.
First Office Action issued in corresponding Chinese Application No. 201910253502.8, mailed Mar. 2, 2021, 4 pages.

* cited by examiner

MULTI-TRANSMISSION RECEPTION POINT (TRP) CONFIGURATION METHOD AND DEVICE, AND STORAGE MEDIUM

CROSS-REFERENCE TO RELATED APPLICATION

This application is a bypass continuation of PCT Application No. PCT/CN2020/081702 filed Mar. 27, 2020, which claims priority to Chinese Patent Application No. 201910253502.8 filed in China on Mar. 29, 2019, both of which are incorporated herein by reference in their entireties.

TECHNICAL FIELD

The present disclosure relates to the technical field of communication, and in particular, to a multi-transmission reception point (TRP) configuration method and device, and a storage medium.

BACKGROUND

In related art, physical downlink control channel-configuration (PDCCH-Config), physical downlink shared channel-configuration (PDSCH-Config) and physical uplink control channel-configuration (PUCCH-Config) are all designed on the basis of single transmission reception point (TRP). Only one PDCCH-Config, PDSCH-Config or PUCCH-Config can play a role in each bandwidth part (BWP) at the same time. A new configuration takes effect after an RRC reconfigures one PDCCH-Config, PDSCH-Config or PUCCH-Config.

For a multi-TRP scenario, a terminal may receive PDCCH or PDSCH transmitted by a plurality of TRPs, or a terminal may transmit PUCCH to a plurality of TRPs. Configurations in related art cannot meet the requirements of the multi-TRP scenario.

SUMMARY

Embodiments of the present disclosure provide a multi-transmission reception point (TRP) configuration method and device, and a storage medium, so as to solve the problem that configurations cannot meet the requirements of the multi-TRP scenario.

According to a first aspect, an embodiment of the present disclosure provides a multi-TRP configuration method. The method includes: configuring one physical channel-configuration information element (IE) to correspond to a plurality of control resource sets (CORESET); or configuring a plurality of physical channel-configuration IEs to correspond to a plurality of CORESETs, where the plurality of CORESETs correspond to a plurality of TRPs, and at least one CORESET of the plurality of CORESETs corresponds to one TRP.

According to a second aspect, an embodiment of the present disclosure provides a multi-TRP configuration device. The device includes: a first configuration unit, used to configure one physical channel-configuration information element (IE) to correspond to a plurality of control resource sets (CORESET); or a second configuration unit, used to configure a plurality of physical channel-configuration IEs to correspond to a plurality of CORESETs, where the plurality of CORESETs correspond to a plurality of TRPs, and at least one CORESET of the plurality of CORESETs corresponds to one TRP.

According to a third aspect, an embodiment of the present disclosure provides a multi-TRP configuration device. The device includes: a processor, a memory and a computer program which is stored in the memory and capable of running on the processor, where the computer program, when being executed by the processor, implements the steps of the multi-TRP configuration method provided by the embodiment of the present disclosure.

According to a fourth aspect, an embodiment of the present disclosure provides a computer readable storage medium. The computer readable storage medium stores a computer program, where the computer program, when being executed by the processor, implements the steps of the multi-TRP configuration method provided by the embodiment of the present disclosure.

According to the multi-TRP configuration method and device, and the storage medium provided by the embodiments of the present disclosure, the configured physical channel-configuration can meet the requirements of the multi-TRP scenario.

BRIEF DESCRIPTION OF THE DRAWINGS

To describe the technical solutions in the embodiments of the present disclosure more clearly, the following briefly describes the accompanying drawings required in the embodiments of the present disclosure. A person of ordinary skill in the art may still derive other drawings from these accompanying drawings without creative efforts.

DETAILED DESCRIPTION

Figure 1:
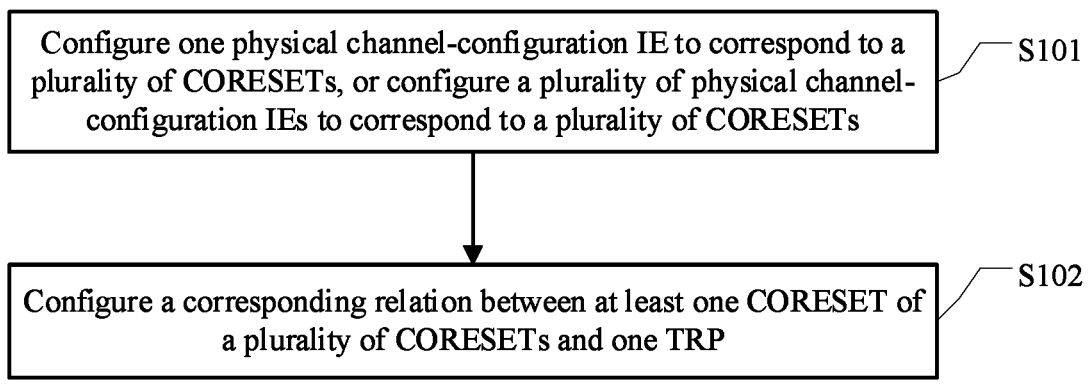
FIG. 1 is a schematic flowchart of a multi-TRP configuration method according to an embodiment of the present disclosure.

The features and exemplary embodiments of each aspect of the present disclosure will be described below in detail. To make the objectives, technical solutions, and advantages of the present disclosure more clearly, the following further describes the present disclosure in detail with reference to the accompanying drawings and embodiments. It should be understood that the specific embodiments described herein are only configured to explain the present disclosure, but are not configured to limit the present disclosure. For a person skilled in the art, the present disclosure may be implemented without some of these specific details. The following description of the embodiments is only to provide a better understanding of the present disclosure by showing examples of the present disclosure.

It should be noted that in this specification, relational terms such as first and second are used only to differentiate an entity or operation from another entity or operation, and do not require or imply that any actual relation or sequence exists between these entities or operations. In addition, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. Without more restrictions, the elements defined by the sentence "including a . . . " do not exclude the existence of other identical elements in the process, method, article, or device including the elements.

In order to solve the related technical problems, embodiments of the present disclosure provide a multi-TRP configuration method and device, and a storage medium. First, the multi-TRP configuration method provided by the embodiment of the present disclosure will be described in detail below.

The multi-TRP configuration method provided by the embodiment of the present disclosure is optionally suitable for a multi-TRP configuration device. The multi-TRP configuration device may be a commonly used base station, may also be an evolved node base station (eNB), or may also be a network side device (for example, a next generation node base station (gNB)) in a 5G system or a network side device in a subsequent evolved communications system. However, the foregoing words do not constitute a limitation on the protection scope of the present disclosure.

The multi-TRP configuration method provided by the embodiment of the present disclosure may include: configuring one physical channel-configuration IE to correspond to a plurality of CORESETs, or configuring a plurality of physical channel-configuration IEs to correspond to a plurality of CORESETs, where the plurality of CORESETs correspond to a plurality of TRPs, and at least one CORESET of the plurality of CORESETs corresponds to one TRP.

According to the multi-TRP configuration method provided by the embodiment of the present disclosure, the configured physical channel-configuration can meet the requirements of the multi-TRP scenario.

Figure 2:
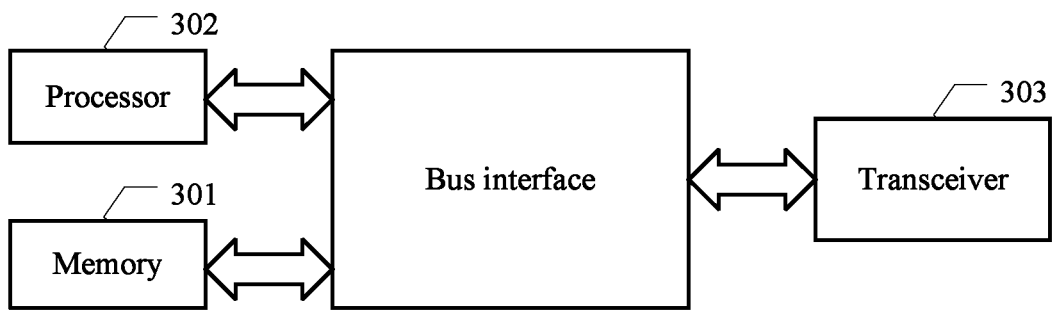
FIG. 2 is a schematic diagram of a hardware structure of a multi-TRP configuration device according to an embodiment of the present disclosure.

In one embodiment of the present disclosure, the multi-TRP configuration method provided by the embodiment of the present disclosure may further include: configuring a corresponding relation between at least one CORESET of a plurality of CORESETs and one TRP. The multi-TRP configuration method provided by the embodiment of the present disclosure is shown in FIG. 2. FIG. 2 is a schematic flowchart of a multi-TRP configuration method according to an embodiment of the present disclosure. The multi-TRP configuration method may include:

S101: configuring one physical channel-configuration IE to correspond to a plurality of CORESETs, or configuring a plurality of physical channel-configuration IEs to correspond to a plurality of CORESETs.

S102: configuring a corresponding relation between at least one CORESET of a plurality of CORESETs and one TRP.

In one embodiment of the present disclosure, the physical channel-configuration IE includes at least one of the following items:

a physical downlink control channel-configuration IE (PDCCH-Config IE), a physical downlink shared channel-configuration IE (PDSCH-Config IE), or a physical uplink control channel-configuration IE (PUCCH-Config IE).

In one embodiment of the present disclosure, the step of configuring a corresponding relation between at least one CORESET of a plurality of CORESETs and one TRP may include: grouping the plurality of CORESETs to obtain a plurality of CORESET groups; and configuring a corresponding relation between each CORESET group and one TRP.

It may be understood that one CORESET group includes a plurality of CORESETs.

Exemplarily, suppose there are six CORESETs, which are CORESET1, CORESET2, CORESET3, CORESET4, CORESET5 and CORESET6 respectively. The six CORE-SETs are divided into three groups: CORESET group 1, CORESET group 2 and CORESET group 3, where the CORESET group 1: includes CORESET1, CORESET2 and CORESET3; the CORESET group 2 includes: CORESET4 and CORESET5; and the CORESET group 3 includes: CORESET6. Each CORESET group corresponds to one TRP. Further, the CORESET group 1 may be explicitly configured to correspond to TRP1, the CORESET group 2 may be explicitly configured to correspond to TRP2, and the CORESET group 3 may be explicitly configured to correspond to TRP3.

In one embodiment of the present disclosure, the step of configuring a corresponding relation between at least one CORESET of a plurality of CORESETs and one TRP may include: determining a plurality of default CORESETs, where each default CORESET corresponds to one TRP; and configuring an association relation between other CORE-SETs and one default CORESET respectively. Therefore, at least two CORESETs with the association relation correspond to one TRP. Further, a corresponding relation between each default CORESET and one TRP may be explicitly configured, so that a corresponding relation with at least two CORESETs with an association relation and one TRP is determined.

In one embodiment of the present disclosure, a corresponding relation between CORESET and TRP may be configured in physical downlink control channel-configuration IE (PDCCH-Config IE) of a radio resource control (RRC) signaling.

In one embodiment of the present disclosure, the fact that at least one CORESET of a plurality of CORESETs corresponds to one TRP may include: grouping a plurality of CORESETs to obtain a plurality of CORESET groups, where each CORESET group corresponds to one TRP.

In one embodiment of the present disclosure, the fact that at least one CORESET of a plurality of CORESETs corresponds to one TRP may include: determining a plurality of default CORESETs; and configuring an association relation between at least one of the CORESETs and one default CORESET, where the CORESET with an association relation corresponds to one TRP.

In one embodiment of the present disclosure, a corresponding relation between CORESET and TRP may further be configured in other radio resource control (Radio Resource Control, RRC) signaling, that is, a configuration IE of the corresponding relation between the CORESET and TRP may be included in the RRC signaling.

In one embodiment of the present disclosure, the step of configuring one physical channel-configuration IE to correspond to a plurality of CORESETs may include: configuring a field included in the physical channel-configuration IE to correspond to a plurality of configuration IEs, where each configuration IE associates with a plurality of CORESETs corresponding to one TRP, or each configuration IE associates with a CORESET group corresponding to one TRP, or each configuration IE associates with a TCI state of a CORESET group corresponding to one TRP.

In one embodiment of the present disclosure, a physical channel-configuration IE includes a physical downlink control channel-configuration (PDCCH-Config) IE; and the above field includes at least one of following fields:

a downlink preemption (downlinkPreemption) field, a transmission power control-physical uplink shared channel (tpc-PUSCH) field, a transmission power control-physical uplink control channel (tpc-PUCCH) field, or a transmission power control-sounding reference signal (tpc-SRS) field.

In one embodiment of the present disclosure, a physical channel-configuration IE includes a physical downlink shared channel-configuration (PDSCH-Config) IE; and the above field includes at least one of the following fields:

a PDSCH data scrambling identity (dataScramblingIdentityPDSCH) field, a modulation and coding scheme table (mcs-Table) field, a maximum number of code words scheduled by downlink control information (maxNrofCodeWordsScheduledByDCI) field, and an aperiodic zero-power channel state information reference signal resource sets to add modification list (aperiodic-ZP-CSI-RS-ResourceSetsToAddModList) field, or an aperiodic zero-power channel state information reference signal resource sets to release list (aperiodic-ZP-CSI-RS-ResourceSetsToReleaseList) field.

In one embodiment of the present disclosure, a physical channel-configuration IE includes a physical uplink control channel-configuration (PUCCH-Config) IE; and the above field includes at least one of fields included in the PUCCH-Config IE.

It may be understood that the PUCCH-Config IE includes the following fields:

a PUCCH resource set field, a PUCCH resource field, a PUCCH format field, a scheduling request resource field, a multi-channel state information physical uplink control channel resource list (multi-CSI-PUCCH-ResourceList) field, a timing list (dl-DataToUL-ACK) field, a reference signal and PUCCH spatial relation field and a PUCCH power control (pucch-PowerControl) field, where the PUCCH resource set field includes: a PUCCH resource set to add modification (resourceSetToAddModList) field and a PUCCH resource set to release (resourceSetToReleaseList) field; the PUCCH resource field includes: a PUCCH resource to add modification (resourceSetToAddModList) field and a PUCCH resource to release (resourceSetToReleaseList) field; the PUCCH format field includes: a format1 field, a format2 field, a format3 field and a format4 field; the scheduling request resource field includes: a scheduling request resource to add modification (schedulingRequestResourceToAddModList) field and a scheduling request resource to release (schedulingRequestResourceToReleaseList) field; and a reference signal and PUCCH spatial relation field includes: a reference signal and PUCCH spatial relation to add modification (spatialRelationInfoToAddModList) field and a reference signal and PUCCH spatial relation to release (spatialRelationInfoToReleaseList) field.

In one embodiment of the present disclosure, the step of configuring a field included in a physical channel-configuration IE to correspond to a plurality of configuration IEs may include: extending the field included in the physical channel-configuration IE into a plurality of fields, where each field corresponds to one configuration IE.

Configuration of PDCCH-Config IE is taken as an example. A downlinkPreemption field in the PDCCH-Config IE is extended into N fields which are a downlinkPreemption field, a downlinkPreemption1 field, . . . , a downlinkPreemptionN-1 field. The extended N fields associate with a plurality of CORESETs or one CORESET group respectively. That is, the above N fields correspond to one configuration IE respectively.

The downlinkPreemption field, the downlinkPreemption1 field, . . . , the downlinkPreemptionN-1 field may sequentially associate with a plurality of CORESET IDs or CORESET ID groups according to a preset association relation, for example, may sequentially perform association according to a sequence of the default CORESET IDs from small to large or a sequence of the CORESET group IDs from small to large. DownlinkPreemption1, tpc-PUSCH1, tpc-PUCCH1 and tpc-SRS1 in PDCCH-Config are used when PDCCH is transmitted on the CORESET with a smaller CORESET ID. DownlinkPreemption2, tpc-PUSCH2, tpc-PUCCH2 and tpc-SRS2 in PDCCH-Config are used when PDCCH is transmitted on the CORESET with a larger CORESET ID.

The codes for extending into two configuration are as follows:

downlinkPreemption1 SetupRelease {DownlinkPreemption} OPTIONAL,
downlinkPreemption2 SetupRelease {DownlinkPreemption} OPTIONAL,
tpc-PUSCH1 SetupRelease {PUSCH-TPC-CommandConfig} OPTIONAL,
tpc-PUSCH2 SetupRelease {PUSCH-TPC-CommandConfig} OPTIONAL,
tpc-PUCCH1 SetupRelease {PUCCH-TPC-CommandConfig} OPTIONAL,
tpc-PUCCH2 SetupRelease {PUCCH-TPC-CommandConfig} OPTIONAL,
tpc-SRS1 SetupRelease {SRS-TPC-CommandConfig} OPTIONAL, and
tpc-SRS2 SetupRelease {SRS-TPC-CommandConfig} OPTIONAL,
where OPTIONAL represents that the item is optional.

In one embodiment of the present disclosure, the plurality of extended fields are located at the end of the physical channel-configuration IE.

The extended two configuration field codes located at the end of the PDCCH-Config IE are as follows:

downlinkPreemption1 SetupRelease {DownlinkPreemption} OPTIONAL,
tpc-PUSCH1 SetupRelease {PUSCH-TPC-CommandConfig} OPTIONAL,
tpc-PUCCH1 SetupRelease {PUCCH-TPC-CommandConfig} OPTIONAL,
tpc-SRS1 SetupRelease {SRS-TPC-CommandConfig} OPTIONAL, and
downlinkPreemption2 SetupRelease {DownlinkPreemption} OPTIONAL,
tpc-PUSCH2 SetupRelease {PUSCH-TPC-CommandConfig} OPTIONAL,
tpc-PUCCH2 SetupRelease {PUCCH-TPC-CommandConfig} OPTIONAL, and
tpc-SRS2 SetupRelease {SRS-TPC-CommandConfig} OPTIONAL.

The plurality of extended fields are configured at the end of the physical channel-configuration IE, so that the physical channel configuration can be compatible with a terminal device of a lower version.

In one embodiment of the present disclosure, the step of configuring a field included in the physical channel-configuration IE to correspond to a plurality of configuration IEs may include: extending the field included in the physical channel-configuration IE into an IE configuration sequence, where each element in the IE configuration sequence corresponds to one configuration.

In one embodiment of the present disclosure, for a field corresponding to only one configuration IE in the physical configuration IE, the configuration IE corresponding to the field associates with a plurality of TRPs.

Configuration of the downlinkPreemption in the PDCCH-Config IE field is taken as an example. The downlinkPreemption field is extended into an IE configuration sequence. The extended IE configuration sequence is as follows:

downlinkPreemption sequence (SIZE (1 . . . . N)) OF SetupRelease {DownlinkPreemption}OPTIONAL, where the IE configuration sequence includes N elements, and each element corresponds to one configuration IE.

Suppose N is 2, a first element in the IE configuration sequence associates with a smaller CORESET ID, and a second element in the IE configuration sequence associates with a larger CORESET ID, where the smaller CORESET ID and the larger CORESET ID correspond to two TRPs respectively. A configuration corresponding to the first element in the downlinkPreemption field sequence in the PDCCH-Config is used when the PDCCH is transmitted on the CORESET with a smaller CORESET ID. A configuration corresponding to the second element in the downlinkPreemption field sequence in the PDCCH-Config is used when the PDCCH is transmitted on the CORESET with a larger CORESET ID.

In one embodiment of the present disclosure, downlink control information (DCI) scheduling, uplink dynamic grant scheduling or a configured grant type 2 (Configured grant type 2: RRC configures a transmission cycle, L1/L2 layer control signal activates or deactivates) scheduling may determine TRP through CORESET of DCI transmitting signal, so that a terminal may determine which configuration IE of each field included in PDCCH-Config IE, PDSCH-Config IE or PUCCH-Config IE is applied to PDCCH and PDSCH received by the terminal and PUCCH transmitted by the terminal.

In one embodiment of the present disclosure, with respect to RRC configuration grant PUSCH, PUCCH, sounding reference signal (SRS) transmission configured grant type 1 (Configured grant type 1: RRC configured or activated uplink transmission grant), the association with TRP may be determined by a configured transmission configuration indicator (TCI), so that a terminal may determine which configuration IE of each field included in PDCCH-Config IE, PDSCH-Config IE or PUCCH-Config IE is applied to PDDCH and PDSCH received by the terminal and PUCCH transmitted by the terminal.

In one embodiment of the present disclosure, the multi-TRP configuration device may adopt any one of the above fields to configure a plurality of TRPs using the same configuration.

In one embodiment of the present disclosure, a TCI-states (TCI-States) field may include TCI states of all TRPs, where the TCI state of each BWP may be globally numbered, where the global numbering in the embodiment of the present disclosure refers to sequential numbering in a natural number order.

In one embodiment of the present disclosure, each CORESET may activate its own medium access control (Medium Access Control, MAC) control element (CE) through the MAC CE. The TCI of the PDSCH corresponds to its own CORESET activated TCI.

In one embodiment of the present disclosure, a plurality of physical channel-configuration IEs may be configured to correspond to a plurality of CORESETs. The step of configuring a plurality of physical channel-configuration IEs may be configured to correspond to a plurality of CORESETs may include: configuring an association relation between a field in each physical channel-configuration IE of a plurality of physical channel-configuration IEs and any one of the following items: at least one CORESET, one CORESET group, or one TRP.

In one embodiment of the present disclosure, if there is no field in one physical channel-configuration IE to have the association relation with any one of the following items: at least one CORESET, one CORESET group, or one TRP, the physical channel-configuration IE associates with the one default CORESET, one CORESET group and one TRP.

Exemplarily, suppose three PUCCH-Config IEs are configured to correspond to three CORESET groups, three PUCCH-Config IEs are configured at the same time, where each PUCCH-Config IE corresponds to one CORESET group. Furthermore, one defaultControlResourceSetGroupID field is configured in each PUCCH-Config IE to correspond to the default CORESET ID.

Meanwhile, codes for configuring the three PDCCH-Config IEs may be:

```
PDCCH-Config1 ::= SEQUENCE {
    defaultControlResourceSetGroupID    ControlResourceSetId
    ...
}
PDCCH-Config2 ::= SEQUENCE {
    defaultControlResourceSetGroupID    ControlResourceSetId
    ...
}
PDCCH-Config3 ::= SEQUENCE {
    defaultControlResourceSetGroupID    ControlResourceSetId
    ...
}
```

Each BWP may have a plurality of physical channel configurations at the same time by configuring a plurality of physical channel-configuration IEs to correspond to a plurality of CORESET groups, so that the configured physical channel configuration can meet the requirements of the multi-TRP scenario.

Corresponding to the above method embodiment, an embodiment of the present disclosure further provides a multi-TRP configuration device. The multi-TRP configuration device may include:

a first configuration unit, used to configure one physical channel-configuration information element (IE) to correspond to a plurality of control resource sets (CORESET); or a second configuration unit, used to configure a plurality of physical channel-configuration IEs to correspond to a plurality of CORESETs, where the plurality of CORESETs correspond to a plurality of TRPs, and at least one CORESET of the plurality of CORESETs corresponds to one TRP.

In one embodiment of the present disclosure, the fact that at least one CORESET of the plurality of CORESETs corresponds to one TRP includes: grouping the plurality of CORESETs to obtain a plurality of CORESET groups, where each CORESET group corresponds to one TRP.

In one embodiment of the present disclosure, the fact that at least one CORESET of the plurality of CORESETs corresponds to one TRP includes: determining a plurality of default CORESETs; and configuring an association relation between at least one of other CORESETs and one default CORESET, where the CORESET with the association relation corresponds to one TRP.

In one embodiment of the present disclosure, the multi-TRP configuration device provided by the embodiment of the present disclosure may further include:

a third configuration unit, used to configure a corresponding relation between at least one CORESET of a plurality of CORESETs and one TRP.

In one embodiment of the present disclosure, the third configuration module may be specifically configured to:

group the plurality of CORESETs to obtain a plurality of CORESET groups; and configure a corresponding relation between each CORESET group and one TRP.

In one embodiment of the present disclosure, the third configuration module may be specifically configured to:

determine a plurality of default CORESETs;

configure an association relation between other CORESETs and one default CORESET respectively; and configure a corresponding relation between two CORESETs with the association and one TRP.

In one embodiment of the present disclosure, the corresponding relation may be configured in a physical downlink control channel-configuration IE.

In one embodiment of the present disclosure, the first configuration unit may be specifically configured to:

configure a field included in a physical channel-configuration IE to correspond to a plurality of configuration IEs, where each configuration IE associates with a plurality of CORESETs corresponding to one TRP, or each configuration IE associates with a CORESET group corresponding to one TRP, or each configuration IE associates with a transmission configuration indicator (TCI) state of a CORESET group corresponding to one TRP.

In one embodiment of the present disclosure, the first configuration unit may be specifically configured to:

extend the field included in the physical channel-configuration IE into a plurality of fields, where each field corresponds to one configuration IE; or extend the field included in physical channel-configuration IE into an IE configuration sequence, where each element in the IE configuration sequence corresponds to one configuration IE.

In one embodiment of the present disclosure, for a field corresponding to only one configuration IE in the physical configuration IE, the configuration IE corresponding to the field associates with a plurality of TRPs.

In one embodiment of the present disclosure, the second configuration unit may be specifically configured to: configure a corresponding relation between one field in each physical channel-configuration IE of the plurality of physical channel-configuration IEs and any one of the following items:

at least one CORESET, one CORESET group, or one TRP.

In one embodiment of the present disclosure, if there is no field in one physical channel-configuration IE to have the association relation with any one of the following items: at least one CORESET, one CORESET group, or one TRP, the physical channel-configuration IE associates with the one default CORESET, one CORESET group and one TRP.

In one embodiment of the present disclosure, the physical channel-configuration IE includes at least one of the following items:

a physical downlink control channel-configuration (PDCCH-Config) IE;

a physical downlink shared channel-configuration (PDSCH-Config) IE; or a physical uplink control channel-configuration (PUCCH-Config) IE.

FIG. 2 is a schematic diagram of a hardware structure of a multi-TRP configuration device according to an embodiment of the present disclosure. The multi-TRP configuration device includes: a memory 301, a processor 302, a transceiver 303, and a computer program stored in the memory 301 and capable of running on the processor 302.

The processor 302 may be configured to: configure one physical channel-configuration information element (IE) to correspond to a plurality of control resource sets (CORESET), or configure a plurality of physical channel-configuration IEs to correspond to a plurality of CORESETs, where the plurality of CORESETs correspond to a plurality of TRPs, and at least one CORESET of the plurality of CORESETs corresponds to one TRP.

In FIG. 2, a bus architecture may include any quantity of interconnected buses and bridges, which are specifically connected together by one or more processors represented by the processor 302 and various circuits of a memory represented by the memory 301. The bus architecture may further connect together various other circuits of a peripheral device, a voltage stabilizer, a power management circuit, and the like, which are known in this art and will not be further described herein. The bus interface provides an interface. The transceiver 303 may be a plurality of elements, that is, include a transmitter and a receiver, providing a unit configured to communicate with various other devices on a transmission medium, and is configured to receive and transmit data under the control of the processor 302. The processor 302 is responsible for management on and general processing of the bus architecture. The memory 301 may store data used by the processor 302 during operation execution.

Optionally, an embodiment of the present disclosure further provides a multi-TRP configuration device, including a processor 302, a memory 301, and a computer program stored in the memory 301 and capable of running on the processor 302, where the computer program, when being executed by the processor 302, implements various processes applied to the multi-TRP configuration method embodiment, and the same technical effect can be achieved. To avoid repetition, details are not described herein again.

Figure 3:
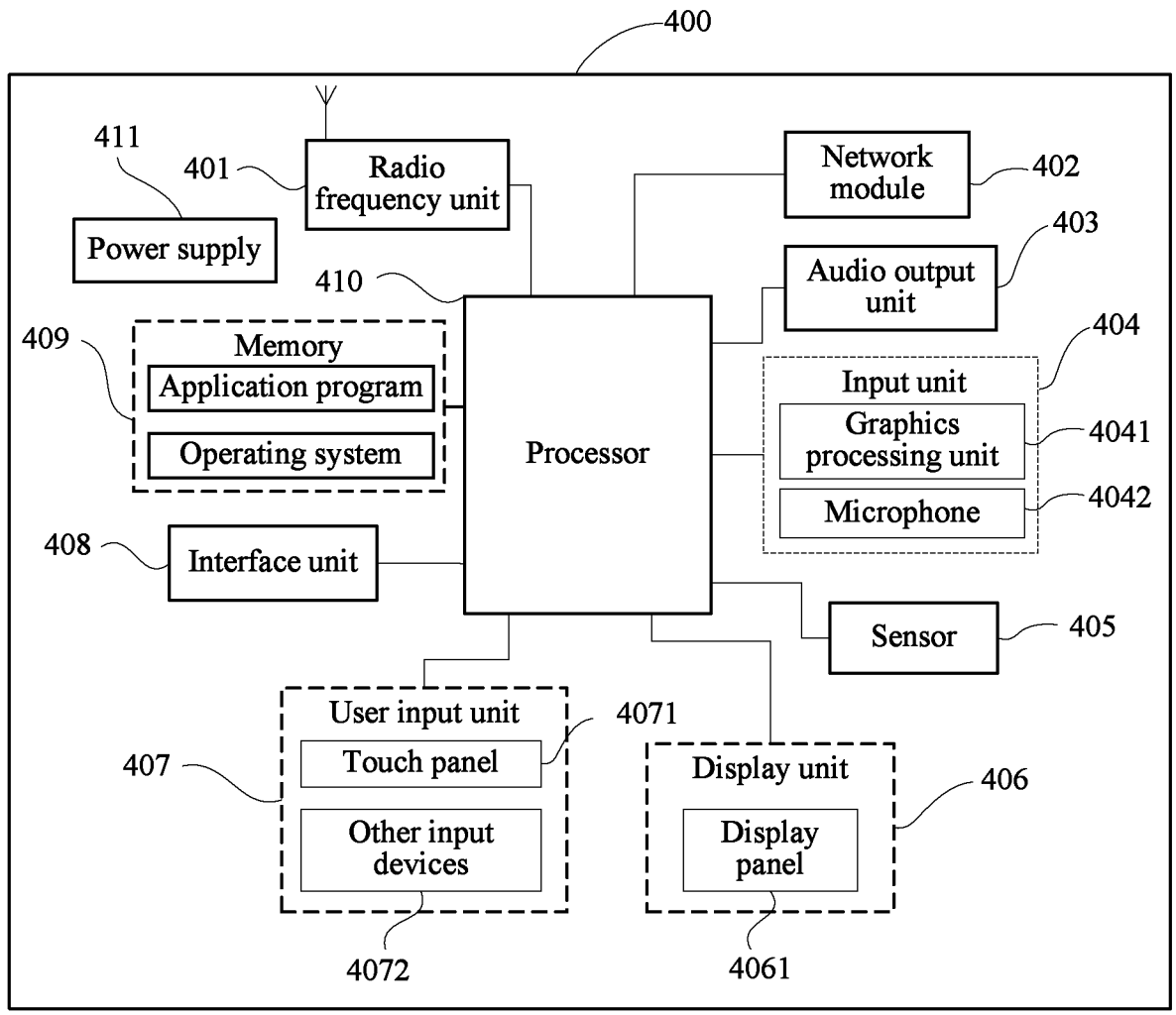
FIG. 3 is a schematic diagram of a hardware structure of a terminal device according to an embodiment of the present disclosure.

FIG. 3 is a schematic diagram of a hardware structure of a terminal device according to an embodiment of the present disclosure. The terminal device 400 includes, but is not limited to: a radio frequency unit 401, a network module 402, an audio output unit 403, an input unit 404, a sensor 405, a display unit 406, a user input unit 407, an interface unit 408, a memory 409, a processor 410 and a power supply 411. A person skilled in the art may understand that the structure of the terminal device shown in FIG. 3 does not constitute a limitation to the terminal device. The terminal device may include more or fewer components than that shown in the figure, or a combination of some components, or an arrangement of different components. In the embodiment of the present disclosure, the terminal device includes but is not limited to a mobile phone, a tablet computer, a notebook computer, a palmtop computer, a vehicle-mounted terminal, a wearable device, a pedometer, or the like.

The processor 410 is configured to, according to a physical channel configuration IE, receive PDCCH or PDSCH of a plurality of TRPs, or transmit PUCCH to the plurality of TRPs.

According to the embodiment of the present disclosure, the configured physical channel-configuration can meet the requirements of the multi-TRP scenario.

It should be understood that, in this embodiment of the present disclosure, the radio frequency unit 401 may be configured to transmit and receive information, or transmit or receive signals during communication. Specifically, after receiving downlink data from a base station, the radio frequency unit sends the downlink data to the processor 410 for processing. In addition, the radio frequency unit sends the uplink data to the base station. Generally, the radio frequency unit 401 includes but is not limited to an antenna, at least one amplifier, a transceiver, a coupler, a low noise amplifier, and a duplexer. In addition, the radio frequency unit 401 may further communicate with a network and other devices through a wireless communications system.

The terminal device provides a user with wireless broadband Internet access through the network module 402, for example, helps the user send and receive emails, browse web pages, and access streaming media.

The audio output unit 403 may convert audio data received through the radio frequency unit 401 or the network module 402 or stored in the memory 409 into an audio signal and output the audio signal as a sound. Moreover, the audio output unit 403 may also provide an audio output (such as a receiving sound of a calling signal, a message receiving sound, and the like) related to a specific function executed by the terminal device 400. The audio output unit 403 includes a speaker, a buzzer, a telephone receiver, and the like.

The input unit 404 is configured to receive audio or video signals. The input unit 404 may include a graphics processing unit (GPU) 4041 and a microphone 4042. The graphics processing unit 4041 processes image data of a static picture or video obtained by an image capture apparatus (such as a camera) in a video capture mode or an image capture mode. A processed image frame may be displayed on the display unit 406. The image frame processed by the graphics processing unit 4041 may be stored in the memory 409 (or other storage mediums) or sent by using the radio frequency unit 401 or the network module 402. The microphone 4042 may receive a sound and can process such sound into audio data. The processed audio data may be converted, in a telephone call mode, into a format that may be sent by the radio frequency unit 401 to a mobile communication base station for output.

The terminal device 400 further includes at least one sensor 405, such as an optical sensor, a motion sensor, and other sensors. Specifically, the light sensor includes an ambient light sensor and a proximity sensor. The ambient light sensor may adjust luminance of the display panel 4061 based on brightness of ambient light. The proximity sensor may turn off the display panel 4061 and/or backlight when the terminal device 400 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, and an infrared sensor. Details are not described herein.

The display unit 406 is configured to display information input by a user or information provided to a user. The display unit 406 may include a display panel 4061, and the display panel 4061 may be configured in a form of liquid crystal display (LCD), organic light-emitting diode (OLED), or the like.

The user input unit 407 may be configured to receive input digit or character information, and generate a key signal input related to a user setting and function control of the terminal device. Specifically, the user input unit 407 includes a touch panel 4071 and another input device 4072. The touch panel 4071, also called a touch screen, may collect touch operation on or near the touch panel by users (for example, operation on the touch panel 4071 or near the touch panel 4071 by fingers or any suitable objects or accessories such as a touch pen by the users). The touch panel 4071 may include two parts: a touch detection device and a touch controller. The touch detection device detects a touch position of a user, detects a signal brought by a touch operation, and transmits the signal to the touch controller. The touch controller receives touch information from the touch detection device, converts the touch information into contact coordinates, sends the contact coordinates to the processor 410, and receives and executes a command from the processor 410. In addition, the touch panel 4071 may be implemented by various types such as a resistive type, a capacitive type, an infrared ray type or a surface acoustic wave type. In addition to the touch panel 4071, the user input unit 407 may further include other input devices 4072. Specifically, other input devices 4072 may include but are not limited to at least one of a physical keyboard, a functional button (such as a volume control button or a power on/off button), a trackball, a mouse, or a joystick. Details are not described herein.

Further, the touch panel 4071 may cover the display panel 4061. After detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. In FIG. 3, the touch panel 4071 and the display panel 4061 are configured as two independent components to implement input and output functions of the terminal device, but in some embodiments, the touch panel 4071 and the display panel 4061 may be integrated to implement the input and output functions of the terminal device. Details are not limited herein.

The interface unit 408 is an interface for connecting an external apparatus to the terminal device 400. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 408 may be configured to receive an input (for example, data information or power) from the external apparatus and transmit the received input to one or more elements in the terminal device 400, or transmit data between the terminal device 400 and the external device.

The memory 409 may be configured to store a software program and various data. The memory 409 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 409 may include a high-speed random access memory, or may include a nonvolatile memory, for example, at least one disk storage device, a flash memory, or another volatile solid-state storage device.

The processor 410 is a control center of the terminal. The processor 410 uses various interfaces and lines to connect the various parts of the entire terminal device, and performs various functions of the terminal device and processes data by running or executing software programs and/or modules stored in the memory 409 and invoking data stored in the memory 409, so as to monitor the terminal device as a whole. The processor 410 may include one or more processing units. Optionally, an application processor and a modem processor may be integrated into the processor 410. The application processor mainly processes an operating system, a user interface, an application program, and the like. The modem processor mainly processes wireless communications. It may be understood that alternatively, the modem processor may not be integrated into the processor 410.

The terminal device 400 may further include the power supply 411 (such as a battery) that supplies power to each component. Optionally, the power supply 411 may be logically connected to the processor 410 by using a power management system, to implement functions such as charging, discharging, and power consumption management by using the power management system.

In addition, the terminal device 400 includes some functional modules that are not shown. Details are not described herein.

The embodiment of the present disclosure further provides a computer readable storage medium. The computer readable storage medium stores a computer program instruction, where the computer program instruction, when being processed by a processor, implements various processes in the multi-TRP configuration method embodiment provided in the embodiments of the present disclosure, and the same technical effect can be achieved. To avoid repetition, details are not described herein again. The computer readable storage medium may be a read-only memory (ROM), a random access memory (RAM), a magnetic disk, a compact disc, or the like.

It should be clear that the present disclosure is not limited to the specific configuration and processing described above and shown in the figures. For brevity, a detailed description of a known method is omitted herein. In the foregoing embodiments, several specific steps are described and shown as examples. However, the method process in the present disclosure is not limited to the specific steps described and shown, and a person skilled in the art can make various changes, modifications and additions, or change the sequence between the steps after understanding the spirit of the present disclosure.

The functional blocks shown in the above-mentioned structural block diagram may be implemented as hardware, software, firmware, or a combination thereof. When the functional blocks are implemented as hardware, the functional blocks can be, for example, an electronic circuit, an application specific integrated circuit (ASIC), appropriate firmware, a plug-in, or a function card. When the functional blocks are implemented as software, the elements of the present disclosure are programs or code segments used to perform required tasks. The program or code segment may be stored in a machine-readable medium, or transmitted on a transmission medium or a communication link through a data signal carried in a carrier wave. "Machine-readable medium" may include any medium that can store or transmit information. Examples of machine-readable media include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segment can be downloaded via a computer network such as the Internet, intranet, and so on.

It should also be noted that in the exemplary embodiments mentioned in the present disclosure, some methods or systems are described based on a series of steps or apparatuses. However, the present disclosure is not limited to the sequence of the foregoing steps. In other words, the steps may be performed in the sequence mentioned in the embodiments, or performed in the sequence different from that in the embodiments, or a plurality of steps may be performed simultaneously.

The foregoing descriptions are merely specific implementations of the present disclosure. A person skilled in the art can clearly understand that to describe conveniently and concisely, for a specific working process of the system, module, and unit described above, refer to the corresponding process in the foregoing method embodiments. Details are not described herein again. It should be understood that the protection scope of the present disclosure is not limited to this. Any equivalent modification or replacement readily figured out by a person skilled in the art within the technical scope disclosed in the present disclosure shall fall within the protection scope of the present disclosure.

What is claimed is:

1. A multi-transmission reception point (TRP) configuration method, comprising:
    configuring one physical channel-configuration information element (IE) to correspond to a plurality of control resource sets (CORESET), wherein
    the plurality of CORESETs correspond to a plurality of TRPs, and at least one CORESET in the plurality of CORESETs corresponds to one TRP; and
    the physical channel-configuration IE comprises a physical downlink shared channel-configuration IE (PDSCH-Config IE), and the PDSCH-Config IE comprises a plurality of PDSCH data scrambling identity (dataScramblingIdentityPDSCH) fields, each dataScramblingIdentityPDSCH field associates with the at least one CORESET corresponding to one TRP.

2. The method according to claim 1, wherein to correspond at least one CORESET in the plurality of CORESETs to one TRP, the method further comprises:
    grouping the plurality of CORESETs to obtain a plurality of CORESET groups, wherein each CORESET group corresponds to one TRP.

3. The method according to claim 1, wherein to correspond at least one CORESET in the plurality of CORESETs to one TRP, the method further comprises:
    determining a plurality of default CORESETs; and
    configuring an association relation between at least one of other CORESETs and one default CORESET, wherein a CORESET with the association relation corresponds to one TRP.

4. The method according to claim 1, further comprising:
    configuring a corresponding relation between at least one CORESET in the plurality of CORESETs and one TRP.

5. The method according to claim 4, wherein the corresponding relation is configured in a physical downlink control channel-configuration (PDCCH-Config) IE.

6. A non-transitory computer readable storage medium, storing a computer program that, when executed by a processor, implements a multi-transmission reception point (TRP) configuration method, the method comprising:
    configuring one physical channel-configuration information element (IE) to correspond to a plurality of control resource sets (CORESET), wherein
    the plurality of CORESETs correspond to a plurality of TRPs, and at least one CORESET in the plurality of CORESETs corresponds to one TRP; and
    the physical channel-configuration IE comprises a physical downlink shared channel-configuration IE (PDSCH-Config IE), and the PDSCH-Config IE comprises a plurality of PDSCH data scrambling identity (dataScramblingIdentityPDSCH) fields, each dataScramblingIdentityPDSCH field associates with the at least one CORESET corresponding to one TRP.

7. The non-transitory computer readable storage medium according to claim 6, wherein to correspond at least one CORESET in the plurality of CORESETs to one TRP, the method further comprises:
grouping the plurality of CORESETs to obtain a plurality of CORESET groups, wherein each CORESET group corresponds to one TRP.

8. The non-transitory computer readable storage medium according to claim 6, wherein to correspond at least one CORESET in the plurality of CORESETs to one TRP, the method further comprises:
determining a plurality of default CORESETs; and
configuring an association relation between at least one of other CORESETs and one default CORESET, wherein a CORESET with the association relation corresponds to one TRP.

9. The non-transitory computer readable storage medium according to claim 6, wherein the method further comprises:
configuring a corresponding relation between at least one CORESET in the plurality of CORESETs and one TRP.

10. The non-transitory computer readable storage medium according to claim 9, wherein the corresponding relation is configured in a physical downlink control channel-configuration (PDCCH-Config) IE.

11. A multi-transmission reception point (TRP) configuration device, comprising: a processor, a memory, and a computer program stored in the memory and executable on the processor, wherein the computer program, when executed by the processor, implements a multi-transmission reception point (TRP) configuration method, the method comprising:
configuring one physical channel-configuration information element (IE) to correspond to a plurality of control resource sets (CORESET), wherein
the plurality of CORESETs correspond to a plurality of TRPs, and at least one CORESET in the plurality of CORESETs corresponds to one TRP; and
the physical channel-configuration IE comprises a physical downlink shared channel-configuration IE (PDSCH-Config IE), and the PDSCH-Config IE comprises a plurality of PDSCH data scrambling identity (dataScramblingIdentityPDSCH) fields, each dataScramblingIdentityPDSCH field associates with the at least one CORESET corresponding to one TRP.

12. The TRP configuration device according to claim 11, wherein to correspond at least one CORESET in the plurality of CORESETs to one TRP, the method further comprises:
determining a plurality of default CORESETs; and
configuring an association relation between at least one of other CORESETs and one default CORESET, wherein a CORESET with the association relation corresponds to one TRP.

13. The TRP configuration device according to claim 11, wherein to correspond at least one CORESET in the plurality of CORESETs to one TRP, the method further comprises:
grouping the plurality of CORESETs to obtain a plurality of CORESET groups, wherein each CORESET group corresponds to one TRP.

14. The TRP configuration device according to claim 11, wherein the method further comprises:
configuring a corresponding relation between at least one CORESET in the plurality of CORESETs and one TRP.

15. The TRP configuration device according to claim 14, wherein the corresponding relation is configured in a physical downlink control channel-configuration (PDCCH-Config) IE.

* * * * *